Figure 1:
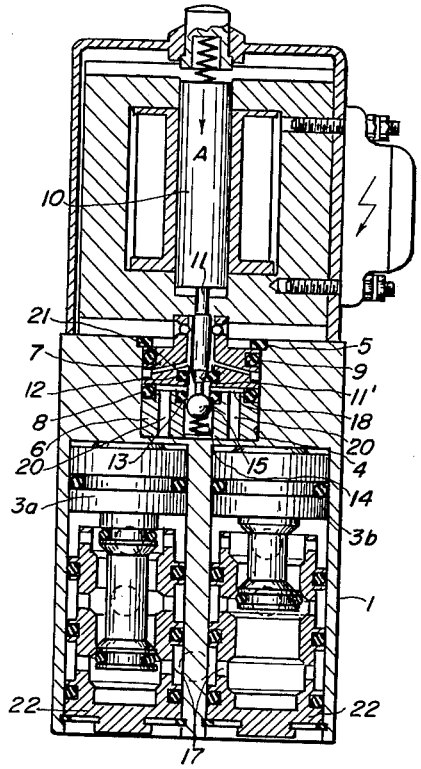

July 27, 1965   B. LEUTENEGGER   3,196,896
CONTROL-VALVE ASSEMBLY
Filed Aug. 10, 1962   2 Sheets-Sheet 1

INVENTOR.
BERNHARD LEUTENEGGER
BY
Karl J. Ross
Attorney

INVENTOR.
BERNHARD LEUTENEGGER
BY
Karl F. Ross
Attorney

United States Patent Office 3,196,896
Patented July 27, 1965

3,196,896
CONTROL-VALVE ASSEMBLY
Bernhard Leutenegger, Alischwiler Strasse 18,
Munchenstein, Switzerland
Filed Aug. 10, 1962, Ser. No. 216,217
Claims priority, application Switzerland, Aug. 11, 1961,
9,484/61
2 Claims. (Cl. 137—271)

The present invention relates to a control-valve assembly having two separate valves arranged in a casing, said separate valves being operated by a pressure means acting on drive pistons and being controlled by an auxiliary valve, preferably operated electromagnetically, the closing parts being interchangeable to give various control paths, and the separate valves being displaceable within conventional sleeves fitted in bores of the casing and sealed therein, said sleeves being replaceably secured in the bores of the casing by means of snap rings.

The invention in such control valves resides in cylinder liners being fitted in the bores of the valve casing, said liners being provided with conical annular shoulders as valve seats which, coacting with flexible sealing rings of the piston valve, form annular valve seats.

Figure 2:
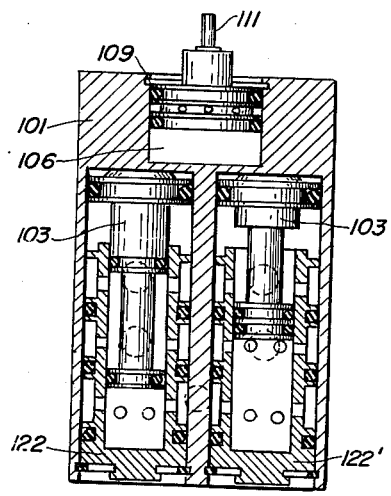
Figure 3:
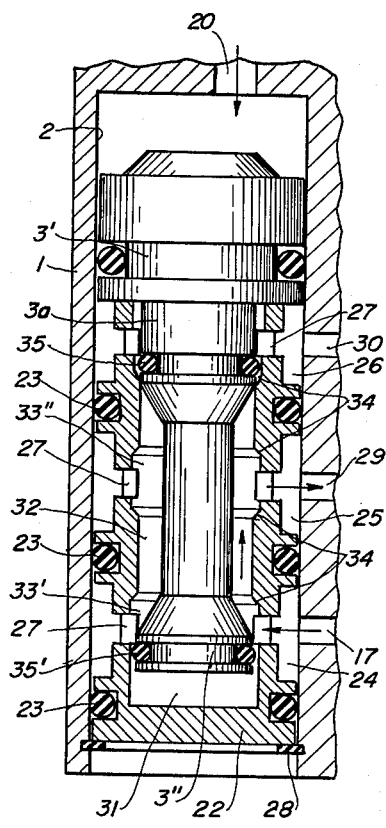
Figure 4:
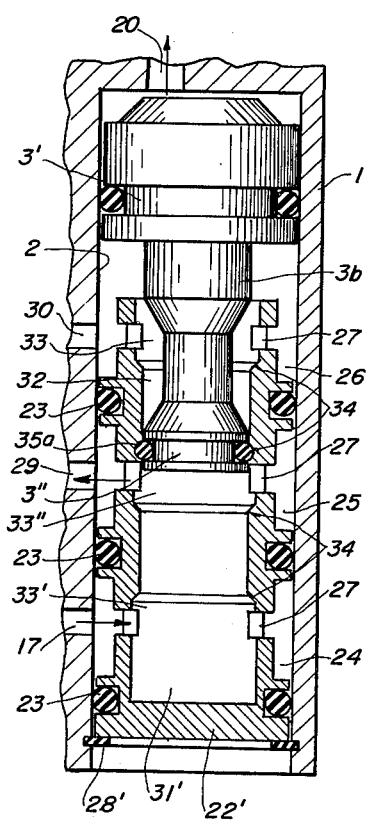

By way of example an embodiment of the object of the invention is shown in the drawings in which:

FIG. 1 is an axial action of the control-valve assembly provided with annular seat valves, FIG. 2 shows the lower part of a well-known contral-valve assembly provided with slide valves instead of annular seat valves, and FIGS. 3 and 4 are detailed sections shown in FIG. 1 to an enlarged scale.

In a blind bore 4 of the valve casing 1 (FIG. 1) there is located a pilot control valve securely held by means of a snap ring 5 fitted in an annular groove of the casing 1. The pilot control valve is formed by two superposed disk-shaped cylindrical valve members 6 and 7 sealed outwardly by means of flexible rings 8 and 9 fitted in annular grooves of said valve members. A stepped plunger 11 connected to an electromagnet 10 passes through the outer valve member 7. In an annular groove of the outer valve member 7 is located a sealing ring 12 coacting with the cone 11' of the stepped plunger 11. The narrowed portion of the stepped plunger 11 passes through a sealing ring 13 fitted in an annular groove of the inner valve member 6 and is connected operatively with a spherical valve body 15 located in a bore 14 of the inner valve member 6. The bore 14 of the inner valve member 6 is connected to a bore 17 via a duct 16, said bore 17 being intended for connecting the casing 1 to the pressure line leading to the source of the pressure medium. On the other hand, the bore 14 is in connection with the pressure side of the piston valve 3 through the valve 15 when it is open and through the chamber 18 and the bores 19 and 20. The two sealing rings 12 and 13 are arranged opposite each other in such a manner that with valve 13, 15 closed the valve 11', 12 is open and vice versa so that with the valve 13, 15 closed the pressure side of the piston 3' is connected to atmosphere through the bores 19, 20, the chamber 18, the valve 11', 12 and the bore 21.

Both piston valves 3a, 3b are designed as differential pistons with a wider and a narrower piston portion 3' and 3" respectively, a long differential piston 3a being fitted in the left-hand valve bore of FIG. 3 and a short one 3b in the right-hand bore of FIG. 4. In both bores 2 and 2' respectively, a cylinder liner 22, 22' is fitted as an exchangeable insert and secured by a snap ring 28, 28' in the bore. The narrower portion 3" each of the piston valves 3a, 3b is displaceably guided in the cylinder liners 22, 22'. The left-hand or long piston valve has at its narrower portion 3", two sealing rings 35 and 35' between which there remains an annular space 32, whereas the right-hand or short piston valve is like-wise surrounded by an annular space and only has a sealing ring 35a at the end of its narrower portion 3". On its circumference, the cylinder liners 22, 22' are each provided with three spaced sealing rings 23 which define the annular spaces 24 and 24 between them, and the topmost sealing ring in addition defines an annular space 26. The annular spaces 24, 25, 26 are connected with the respective interior space 31, 31' of the cylinder liner 22, 22' and with the annular space 32 of the piston valve 3 respectively via the ports 27. The annular space 24 of each cylinder is in connection with a source of compressed air via the respective bore 17 and a pressure line connected to it. On the other hand, the annular space 25 can be connected to an operating machine through the bore 29 and connected with the atmosphere or a reservoir through the bore 30. The axial bores of the cylinder liner 22, 22' are each provided with three equally spaced cylindrical enlargements 33, 33' and 33" the recesses of which form tapered annular shoulders 34 which serve as valve seats for the sealing rings 35, 35' and 35a and form, in coaction with the latter, annular seat valves.

The annular space 24 is continuously under the pressure of the compressed air source, while the cylinder spaces above the large piston portions 3' can alternately be brought in connection with the source of compressed air and with the atmosphere through a respective duct 20 and a connecting line joined to it via the electromagnetic auxiliary or pilot valve.

If the electromagnet 10 is excited, it moves in the direction of the arrow A by which the thinner stem portion of stepped piston 11 pushes the valve ball 15 downwards away from seat 13 and thus opens the valve 15 while concurrently the ring seal 12 is pressed together by the annular shoulder 11' of the stepped piston 11 so that the valve 11', 12 is closed.

When compressed air flows through the duct 20, the piston valve 3a moves downwardly till the top sealing ring 35 is pressed against the valve seat 34 of the enlargement 33 in FIG. 3, while, when compressed air flows through the right-hand duct, the sealing ring 35a is pressed against the valve seat 34 of the middle enlargement 33" in FIG. 4. With the piston valve 3a in the down position in FIG. 3, the annular space 24 is in communication with the annular space 25 via the annular space 32 so that compressed air can be supplied to the operating machine through the bore 29, while escape of compressed air to the annular space 26 connected to the outlet is effectively prevented by the annular seat valve 33, 34, 35.

With the short piston 3b in FIG. 4 there exists the opposite flow conditions when the piston valve is pushed down inasmuch as passage of compressed air from the annular space 24 to the annular space 25 is completely interrupted by the piston sealing ring 35 seating on the lower annular seat 34 of the middle enlargement 33" and instead the annular space 26 is brought into communication by the piston valve by which venting of the line 29 to the operating machine is obtained. If subsequently the space above the piston valve 3 is vented by the auxiliary or pilot valve, then the piston valve is lifted by the compressed air, continuously acting on the bottom side of the piston valve, till the sealing ring 35' in FIG. 3 is pressed against the valve seat 34 of the lower enlargement 33' and in FIG. 4 the sealing ring 35a, as shown, against the upper annular seat 34 of the middle enlargement 33" respectively. In this case in FIG. 3 the compressed-air supply to the operating machine is interrupted, the pipe line 29 to the operating machine being vented, whereas in FIG. 4 compressed-air supply to the operating machine is completed.

The cylinder liners 22, 22' are so designed that both the long and the short piston valve can be used in them interchangeably. When using the long piston valve, the two sealing rings 35, 35' operate in the two outer cylindrical enlargements 33 and 33', whereas when using the short piston valve its sealing ring 35a operates in the middle cylindrical enlargement 33''. By interchanging the long piston valve for the short one or vice versa, a reversal of the flow conditions is obtained. However, both with the long and with the short piston valves any leakage of pressure means in the two end positions is prevented by forcing a piston sealing ring against an annular seat.

FIG. 2 shows an arrangement wherein reference numerals having hundreds units designate parts similar to those of FIG. 1. In this embodiment, however, the liners 122, 122' are employed with a slide valve.

What I claim is:

1. A control-valve assembly comprising a housing formed with at least two cylindrical bores; at least two generally cylindical integral sleeves respectively received in said bores and forming therewith a respective annular fluid passage surrounding said sleeves, said housing being provided with fluid ports communicating with said passages respectively; a pair of reciprocable valve members slidable respectively within said sleeves, said valve members each being provided with at least one annular groove receiving a respective first sealing ring surrounding the valve member and projecting outwardly therebeyond, each of said sleeves having at least two oppositely converging frustoconical annular sealing surfaces engageable with the respective first rings in extreme axial positions of the corresponding valve member for controlling the flow of fluid between the passages of the respective sleeve, each of said sleeves being formed with at least one opening axially adjacent a respective sealing surface and communicating between the interior of each sleeve and the respective passage, said sleeves and valve members being interchangeably disposed in said bores, each of said sleeves being provided with a pair of outwardly open axially spaced circumferential channels flanking the respective opening; and a further sealing ring in each of said channels bearing upon the wall of the respective bore for defining said passages, said sleeves being of axially stepped internal diameters, each having a relatively large internal diameter in the region of the respective openings and a relatively small internal diameter in respective regions separated from said openings by said frustoconical sealing surfaces, said first rings having an external diameter greater than said relatively small internal diameter.

2. An assembly as defined in claim 1 wherein said valve members constitute respective pistons displaceable by fluid pressure, further comprising control means in said housing forming a passage for a pressure fluid adapted to act upon said pistons, and electromagnetic means for operating said control means, said control means including a ball valve operatively coacting with said electromagnetic means.

References Cited by the Examiner

UNITED STATES PATENTS

| 2,417,494 | 3/47 | Hoof | 251—332 |
| 2,611,391 | 9/52 | Sainsbury et al. | 137—596.15 |
| 2,700,986 | 2/55 | Gunn | 137—596.16 |
| 3,043,335 | 7/62 | Hunt | 137—596.15 |
| 3,084,676 | 4/63 | Herion et al. | 137—596.16 X |

M. CARY NELSON, *Primary Examiner.*

MILTON KAUFMAN, *Examiner.*